United States Patent
Steiner

(12) 
(10) Patent No.: US 6,311,176 B1
(45) Date of Patent: *Oct. 30, 2001

(54) METHOD AND DATA STRUCTURE FOR THE COMPUTER-AIDED MANAGEMENT OF DEVELOPMENTS

(75) Inventor: Ralf Steiner, Sangerhausen (DE)

(73) Assignee: IPCentury AG, Merseburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,534

(22) Filed: Aug. 13, 1998

(30) Foreign Application Priority Data

Aug. 29, 1997 (DE) .............................................. 197 37 939

(51) Int. Cl.$^7$ .................................................. G06F 17/00
(52) U.S. Cl. .................................. 706/45; 706/46; 706/60
(58) Field of Search ............................... 706/45, 46, 50, 706/934, 60; 707/100, 500

(56) References Cited

U.S. PATENT DOCUMENTS

| | | | |
|---|---|---|---|
| 4,713,754 | * 12/1987 | Agarwal et al. | 707/100 |
| 4,868,733 | * 9/1989 | Fujisawa et al. | 707/5 |
| 5,208,745 | * 5/1993 | Quentin et al. | 700/83 |
| 5,225,978 | * 7/1993 | Petersen et al. | 705/33 |
| 5,297,039 | * 3/1994 | Kanaegami et al. | 707/5 |
| 5,355,444 | * 10/1994 | Chirico | 706/45 |
| 5,608,857 | * 3/1997 | Ikeo et al. | 707/500 |
| 5,694,523 | * 12/1997 | Wical | 706/45 |
| 5,781,906 | * 7/1998 | Aggarwal et al. | 707/102 |
| 5,854,930 | * 12/1998 | Mclain, Jr. et al. | 717/5 |
| 5,901,068 | 5/1999 | Batchilo et al. | 703/6 |
| 6,038,560 | * 3/2000 | Wical | 707/5 |
| 6,253,217 | * 6/2001 | Dourish et al. | 707/500 |

OTHER PUBLICATIONS

"Comprehensive Site Makes Search Easy," Electronic Engineering Times, Oct. 21, 1996.*

"The Derwent Classification System," Worldwide Databases, vol. 8, No. 5, May 1, 1996.*

Papazoglou, "On the duality of distributed database and distributed Al systems", ACM CIKM pp 1–10, Mar. 1993.*

Anick et al, "Integrating a dynamic lexicon with dynamic full text retrieval system", ACM SIGIR, pp 136–145, Jun. 1993.*

* cited by examiner

Primary Examiner—George B. Davis
Assistant Examiner—Anil Khatri
(74) Attorney, Agent, or Firm—Michael J. Striker

(57) ABSTRACT

The computer-aided official management system for developments described in patents and publications, which limits the official examination work for each development and substantially supports development management, permits data to be organized in a classification system with low redundancy. The management system contains a multiplicity of development systems (1) which emerge from one another by means of set operations via orientated relationships (4), in that each development system (1) is linked to a database (11), which contains, in particular, the definition of the development system (1) serving as a reference system (2), the formulation and status of each individual relationship (4) forming the development system (1), as well as unique indicators to further data. The development systems are uniquely defined as intersection sets in the data structure for linking previously separately considered reference systems via the relationships (4).

7 Claims, 2 Drawing Sheets

METHOD AND DATA STRUCTURE FOR THE COMPUTER-AIDED MANAGEMENT OF DEVELOPMENTS

BACKGROUND OF THE INVENTION

Method and data structure for the computer-aided management of developments

The invention relates to a method and a data structure for the computer-aided management of developments, which are disclosed in particular in patents, utility models and technical publications, via classification system.

Databases are used as a clear and generally computer-aided method of managing large stocks of data, the data structure advantageously being adapted to the relationships of the data elements. A broad distinction can be made between databases organized on a tabular, hierarchical and neural basis. Conventional patent databases contain, for example, relationships to the person of the inventor, the priority date, the International Patent Classification (IPC) and many more. Specific data structures and methods for computer-aided management are known from IPC G06F 17/60. Thus, for example, investors' shares are managed and dealt in with computer assistance on computer stock exchanges, the valuation of the shares taking place by means of weightings, and these being changed accordance with economic trends. The strategy here can be determined by persons or by artificial intelligence (AI) systems.

Property rights represent a form of development management. The statutory property rights for intellectual property guarantee, in various categories, the right of the copyright holder, inventor or applicant (hereinafter referred to for brevity as the inventor) in intangible values created by him, in particular in documented developments made available to the public (hereinafter referred to for brevity as developments). In the case of patents and utility models an absolute prohibitive right is granted in respect of the inventive and novel features, which in the case of patents is optionally narrowly limited officially (hereinafter referred to for brevity as an officially right) by substantive official examination (hereinafter referred to for brevity as examination). In the remaining cases an as yet unexamined absolute prohibitive right is promised inclusively and without limitation (hereinafter referred to for brevity as an inclusive right). Only in the event of conflict is this inclusive right more closely specified at civil law and, in general, restricted or deleted. A justification for this kind of procedure is to be found in the large number of developments and in the expense entailed in an examination. Accordingly, officially examined inventive and novel features are to be found only in examined patents.

Customarily, the number of examinations is restricted simply by the fact that, by law, not all developments are eligible for examined protection. These limitations are occasionally adjusted for economic reasons. Technical and industrial utility are widespread as a criterion, since the limits of this criterion approximately coincide with the economic reasons for industrial law protection. Furthermore, this restriction has the advantage that the determination of inventive and novel features, being for the most part technically related, is comparatively simple. Nevertheless the expense increases constantly as a result of the steadily growing number of developments, since the knowledge of the world community at least doubles every ten years.

Theoretically, the absolute prohibitive right of an inventor does not result in conflicts with third party prohibitive rights. An examination endeavours to ensure this and to find, as objectively as possible and uniformly in all cases, a yardstick whereby an scope of protection can be defined for a specific level of inventiveness. In an examination, theoretically, the entire accessible stock of knowledge is cited against the possible development and examined integrally. In practice, this is done in the patent offices by experts who are knowledgeable in their specific areas. However, an examination of the world's knowledge is made more difficult in addition by the literally inexhaustible flood of information, its redundant accumulation of information and ever-narrowing specialized areas. The expense of an individual examination (in respect of one individual development) thus again increases disproportionately.

As a consequence of this the management of developments, in patent office for example, encounters an administrative limit. There are obviously two possible approaches to management without allowing the expense of an examination to increase beyond a threshold for which there are usually economic justifications.

a) The number of examinations is artificially restricted, for example in that many inventors find official rights too unattractive, for example too expensive or laborious, as compared with inclusive rights. A shift takes place, in terms of numbers, away from the official right to an inclusive one. As a result there will always only be a few official rights, as many as can be officially handled. The consequence is a civil law treatment of individual cases by case law in the event of conflicts. Case law usually differs considerably from that of an examination and is assessed at the discretion of the judges, and therefore not necessarily substantively correct. It is impractical for civil law decisions to be reached on the basis of expertise in the specialized field.

b) The quality of the examination is massively reduced in order to cut expense. As a result it becomes unobjective and so fails as an examination. The consequence is a clash between the granted official rights, which shifts the cost of an official substantive examination to other authorities, for example patent courts, or ultimately results in the virtual worthlessness of such rights.

Future practice is likely to select the method according to a), since otherwise official rights, for example examined patents, will eventually become meaningless, as is already the case in many places with the inclusively granted scope of protection for other inclusive rights, for example in the case of utility models, which increasingly result in conflicts because the scopes of protection overlap. The actual development is not sufficiently specifically defined in this case. As a result, an objective management of developments (hereinafter referred to for brevity as development management), over and above the administrative management of printed publications, is made much more difficult.

SUMMARY OF THE INVENTION

U.S. Pat. No. 4,868,733 discloses a tree-like data structure where concepts are used to retroactively define further concepts which are used in the patent-system. The "vector-model" of a retrieval system like SMART first developed by Salton discloses the forming of an n-dimensional vector-space of retrieval terms.

The object of the invention is to develop a computer-aided official management system for developments which, despite a steadily increasing world knowledge and an increasing number of developments, limits the official examination effort for each development in order to enable the official examination of a substantially larger number of developments for comparable overall official effort. The intention is that, as a result, an official right will be granted that reduces the possibility of conflicts with third-party rights and substantially assists development management. The development management data structure generated is intended to enable the knowledge to be organized within a classification system with a low level of redundancy.

The object is achieved by means of the features stated in the independent Patent Claims 1 and 7. Preferred embodiments will be found in the subclaims.

Substantial advantages are computer-aided examination, official management, monitoring and maintenance of developments, the receptiveness and flexibility in the management of developments associated with a freely selected initialization time, cost limitation within the office, the synthesis of the substantive knowledge of the individual experts in the office and participating third parties, the utilization of the interests of third parties to obtain/protect official rights for the cost-neutral generation of the data structure, a simple and uniform substantive and administrative search, the internal consistency of the data structure with the true facts, the high level of expressiveness of the scopes of protection ascertained and the secondary systematic processing of world knowledge within a classification system with a low level of redundancy.

Advantageous further developments of the invention make it possible to take national peculiarities into account within an overriding or modified management system which is binding upon these national offices, to utilize the development data structure generated as a source of knowledge for expert systems, to administer official rights in a simplified and uniform manner, clearly to ascertain the scope of official rights and infringements thereof, universal extension to non-technical areas of development (for example to include design models and economic developments) and possible decentralized integration into world-wide data networks.

In the administrative sector this invention offers the possibility of processing the objective knowledge of office experts and third parties without additional costs and with low redundancy and making it available to the administration to be used profitably for further exploitation.

The invention is made possible on the basis of management systems for developments that are customary throughout the world, and especially of property right systems, by means of a number of apparently trivial changes in the definition of terms in formulating general guidelines. Only the implementation of these more universal definitions makes it possible, by means of mathematically logical (and hence clear) stages, to create a development management system which is uniform and advantageous for all developments, exhibits a high degree of self-management, converges to the true facts in an inherently consistent manner and minimizes redundancy in the classification and content of the development. These necessary changes essentially relate to the internal office management system and the third parties working with that system on a bilateral basis. As far as the rest of the world is concerned, everything will substantially remain as it has been in the past-precisely so, if necessary, by law for transitional periods. The details of this are discussed in the description that follows and terms, for the sake of easier readability, are defined retroactively if necessary. Mathematical terms are hereinafter defined in accordance with Lexicon of Mathematics, Leipzig Bibliographical Institute (state-owned enterprise), 1985.

The essence of the invention resides, in particular, in the necessary indication of relationships (defined later) by third parties, official formal and substantive examination and subsequent computer-aided management of these relationships, which clearly determine a system (defined later) and can be used retroactively to define further systems. A data structure is incrementally expanded and modified by the information provided by third parties and official examination, via new registrations and changes in status of these relationships. The multiplicity of expansions and modifications associated with the information supplied by third parties converges in an internally consistent manner to the true facts. The third party bears, in respect of his development, his input of time and cost for determining suitable relationships and the cost of their examination by the office. Depending on the examination, the office decides on the status of the registration of this relationship and, optionally, decides of its own motion on the status of further relationships.

The difference from conventional forms of development management, especially by means of patent claims, lies essentially in the definition of relationships as opposed to conventional features. Ideal relationships form, by definition and principle, an interacting pair (means-effect) for a separable ideal problem-solving system (hereinafter referred to for brevity as a system). The ideal system contains, by definition, the set of all solutions to the problem and/or all problems having that solution. It is a one-to-one system, in other words univalent even when reversed. As a (real) relationship in this invention an interactive pair (means-effect) is designated for a (real) system which unambiguously contains the set of solutions to the problem, completeness and reversal not applying. A system forms a (mathematical) space with the set of all possible implementations. The (real) system is a proper subset of the ideal system.

In order to clarify the essence of the invention at this point, a physical example is now considered in more detail. Let the system be a property of a material. Let the interactive pair be the unilateral pressure and the parallel length of an infinitesimal cube within that material. If the two parameters are defined, a characteristic property of the system is identified, in this case the modulus of elasticity, whereby the material is more narrowly restricted in broad terms, for example to steel. On the other hand, with a known modulus of elasticity and a determinate pressure, the length is defined and vice versa. This simple example clarifies the one-to-one defining of an operator by means of the set of all elements of a domain of definition and an image domain if certain (mathematical) conditions, especially the condition of a Hilbert space, are fulfilled in respect of the domains and the operator.

In the case of developments the ideal relationship (means-effect) is equivalent to the ideal system, which is defined one-to-one with all interactive pairs (meanseffect). It follows from this that an ideal development requires, as an adequate determination, exactly two determinate ideal data in each case. An indication of ideal relationships, moreover, combines the categories for property rights: method developments and device developments. However, because perfect knowledge (absolute truth) never exists, it is only ever possible in practice for (real) developments or (real) relationships to be indicated.

With the indication of the relationship, each verbally defined interactive pair (means-effect) is restricted to the set of the system then serving as a relationship (hereinafter referred to for brevity as a reference system). The development of the current state of knowledge in substantive examination necessarily results in due course in a possible change in the status of this relationship and, optionally, through a large number of relationships with standardized weighting, to the convergence of the (real) relationship to the ideal relationship. An ideal data structure, consisting exclusively of ideal relationships, exhibits no redundancy. As a result of the convergence of the relationships, the redundancy of a (real) data structure is reduced. A profound objective consideration of the development before its introduction into the data structure thus assists a high degree of congruence, low redundancy and, in particular, partial solutions that conform more closely to the reference system.

However, the frequently preferred exclusive indication of means or effects (connected with the assumption of the other part, which for the person skilled in the art arises in an obvious manner from the development problem) does not even meet the condition of a real relationship and is therefore often one of the reasons for later disputes about the scope of protection of developments. For example, in the case of the problem "developing an insect trap" a means comprising "yellow paintwork" can produce different effects and solve different partial problems by means of different effects, for example as "corrosion protection", as a "prescribed warning signal for walkers", as a "insect attracting coating", etc., and thus indicate other systems, though this necessarily remains unclear if the associated effect is not indicated.

The scope of protection arises by definition from the mathematical intersection set of all separable systems, in other words from the largest possible new system (problem-solution) which has all the individual relationships (means-effect) to solve all the partial problems, which is precisely what development is. As a result of the mathematical operation of forming the intersection set, each development is necessarily a subset (including improper subsets and null sets) of preceding developments. Similarly, each intersection set operation of development is necessarily a further development. As a result a system is necessarily a topological space. Since each development cannot completely (only in a deeper, more concrete abstraction) exclude the solving of previously known sub-problems of preceding developments, which it necessarily uses to realise the development, a system is necessarily a coherent topological space. From this there necessarily and advantageously arises the uniformity of content of developments which are introduced into this data structure.

A level of inventiveness to be defined by official discretion presupposes the definition of a distance (metric) between individual developments or the relationships that define them. The systems that designate a development therefore necessarily form metric spaces. It is advantageously conceivable for such a definition of a distance to have its roots in the complexity of admissible set operations used, a set operation with more than N (for example three) and fewer than M (for example two) relationships being rejected as "non-inventive", for example. A necessary level of inventiveness could be verified automatically via suitable definitions, for example a definition of such complexity. It is immaterial here whether the relationships are in some cases newly defined (more specific abstraction for a new partial task), the exclusive combination of known relationships (combination patent) or the exclusion of extraneous relationships (exclusion patent). The level of inventiveness here is primarily determined by the inventor himself, irrespective of the substantive accuracy of each individual relationship to be determined in the course of examination. Furthermore, in the examination of the development, the status of each individual relationship could be included in the calculation of the level of inventiveness, as a result of which the substantive examination ultimately, and secondarily, determines the level of inventiveness.

More complex developments, accordingly, since they are not directly inventive, can only be included in the data structure with intermediate developments. This has a number of advantages: first, if the developments remain clear and separated, a uniform data base structure with N relative relationships can be developed, the examination effort and costs are always comparable and the inventor himself, in his own interest (costs and risk of change of the status of each relationship), will always select the substantively most obvious relationship in order to avoid the recording of intermediate developments (for which he would bear the cost). As a result, the redundancy of the content of such recorded developments is reduced even before application for them.

The self-management is based on the relationships to recorded developments (each of which is itself a system), which in principle are proposed by the inventor himself and, ultimately, are officially provided with a status and managed in accordance with this invention. The relationships may be new or previously known and necessarily refer back in development history to other developments (systems). The relationships always clearly define the generic type (precharacterizing clause) of the development with the respective reference system in the combination (intersection set) of the systems allocated to them. Because a system is necessarily a coherent space, the unity of the precharacterizing clause is preserved. Since (real) relationships are involved in practice, each individual system determined by this relationship is to be considered in the development (characterizing clause) as a subset of the associated reference system. Because of a deeper abstraction of an existing (problem-solution) system, novel relationships always lead to an additional restriction of the reference system. False relationships can be regarded as an empty subset.

Consequently, the generic type of the development (precharacterizing clause) clearly exhibits a maximum system which the inventor himself finally defines by the reference systems when applying for the development. The inventor always clearly specifies a relationship by specifying a reference system and a verbal definition relating to means and effect. By examining the substantive accuracy of the relationships, the relationships (means-effect) contained (required in the claims for achieving official rights) being officially evaluated in each case in accordance with their verbal definition relating to means and effect, the status of each individual relationship is determined and managed, for example 1 for 100% correct, 0 for 0% correct. It is conceivable that the status is partly not discretely specified, for example in order to create the foundation for methods based on fuzzy logic by means of rational probability data. The description of a development definitively does not serve to change the status of a relationship but, given a permissible change by the inventor to its verbal definition relating the means and effect, can serve as a pool of possible verbal definition.

In his own interests, the inventor, who wishes to register himself with his development in such a data structure, necessarily selects one or more reference systems which appear most obvious, and extends his development by individual relationships relating thereto by means of verbal definition relating to means and effect. The office examines at its discretion the substantive accuracy of each relationship individually, and the level of inventiveness of the development, and notifies the inventor of the decision concerning the status of the individual relationships, the level of inventiveness and the granting of registration and, optionally, of an official right which has been applied for.

The generic concept of the development is determined exclusively and clearly by the set of all relationships by forming the intersection set of the reference systems applied for by the inventor. The scope of protection (characterizing clause) of the development is clearly defined as a subset of this generic concept by the intersection set of the systems defined via the relationships. Said systems are determined from the partial problem which is appropriately specified in each case in the verbal definition relating to means and effect. Since, by contrast with text passages, substantive accuracy of the relationships (means-effect) in the system (problem-solution) does not require to be interpreted in the individual case but can be evaluated with respect to substantive accuracy ex officio, misunderstandings and deliberate playing with the text can largely be prevented.

As a rule, the relationship specified by the inventor deviates optimally from the substantive one. Optionally, the office makes the inventor additional proposals for a substantively more correct verbal definition relating to means and effect of the relationships (preserving priority) and relating to other more suitable reference systems (not preserving priority) and a better primary level of inventiveness by another combination of these (not preserving priority). In this case, the relationship taken to be substantively accurate is always the relationship evaluated currently by leading specialist circles as: "experimentally confirmed or probably sensible", that is to say this status can change with time. It is conceivable in further developments to specify a plurality of standardized relationships weighted according to probability instead of one relationship. The scope of protection of an absolute right would then have to exceed a confidence level to be defined by the office. It is likewise conceivable to specify the confidence level of a relationship additionally with reference to the office, as a result of which it is possible to take account of different interpretations, for example country-specific ones.

The self-consistency of the method results from a successively undertaken change in these relationships by the office, which is possible at any time. This can be the case ex officio owing to more up-to-date knowledge of leading specialist circles, if the status of a relationship changes impermissibly, and owing to oppositions or applications. The status of relationships can be modified at any time ex officio. A favourable initial base for these is formed by known substantive classification systems, for example the IPC. Relationships of developments which are bound up with active official rights (soon after designated for brevity as instruments) can be modified ex officio only upon application, even if a relationship subsequently proves to be false and would need to acquire the status of 0% accuracy on substantive grounds. However, in order that this change in the relationships and thus in the scope of protection does not necessarily cause extension of property rights in the instruments, the old relationships are maintained with their status together with a specification of the respective period of validity. It is therefore necessary in the case of developments to distinguish between instruments and the remainder without active official right (hereinafter referred to for brevity as documents).

In the case of applications, the shifting, occurring in the case of target instruments, of the expence (of the allocation of the most obvious reference systems as prior art and the verbal means/effect definition of each relationship) to the inventor as person skilled in the art, or to the patent attorney or engineer, who is necessarily substantively expert, substantially emphasizes the substantive non-redundant content and the truth content of otherwise possible, juridically interpretable textual productions. This method renders such instruments fitter again for their original task as property rights. At the same time, the aim of the inventor to obtain an instrument results in the practical realizability of such a method without additional administrative expense. As a result, this invention differs substantially from known expert systems, which must function without the driving force of personal advantage and, therefore, with a few (originating) and many unmotivated (utilizing) participants. The successively developing classification system resulting from the invention in the data structure can be used secondarily as an expert system, but it is primarily a management structure of developments which is built up and further developed by the driving force (and the costs) of a multiplicity of inventors who are striving for an instrument for their development.

The suitable method is essentially along the lines of customary methods for obtaining examined property rights, in particular patents, primarily for the inventor to obtain an instrument for his development, secondarily for the self-financing of this method in offices.

In a first step (application): an inventor submits an application to obtain an instrument relating to a document. The office records the document in the data structure after formal examination, in particular of the relationships, as a document with a time-limited publication protection (as a laid-open publication) in accordance with the relationships specified by the inventor and with the date of application. Permissible as modification are:

before the publication of the document and within a period observing the date of application (internal priority), the description and, depending on the relationship, the verbal definition relating to means and effect, although necessarily while maintaining the respective reference system, after this period, only the verbal definition relating to means and effect, depending on the relationship, from the pool of the description. It would also be possible in this way to record as documents further documents with a time-limited publication protection, for example utility models.

In a second step (examination): after a period, the office necessarily examines each of the N individual relationships of a document:

for novelty in relation to the date of application in the case of novel relationships, their status (substantive accuracy) at the current time and the level of inventiveness of their set operation and grants the instrument (grants the examined property right) or not. In the case of granting, a copy of the document is recorded in the data structure as an instrument which specifies in the claims, in particular the status of the individual relationships and the time of granting. Particularly in the case of a negative action, the inventor can propose to the office within a period permissible modified relationships which are examined anew, as already set forth above. If there is no compliance with this, the application is deemed to have been withdrawn.

In a third step (objection): within a period, third parties can propose a different interpretation to the office for examination (opposition procedure). Objecting third parties satisfy the formalities if there are grounds relating to:

the substantive accuracy of individual relationships of an instrument, the lack of novelty, demonstrated by relationships of a third party, of individual relationships of an instrument, and there is no level of inventiveness in the set operation of said relationships of an instrument. The office informs the inventor of the successful objection, and affords him an opportunity to make a counter statement. On the basis of up-to-date knowledge argued by third parties, of counter statements of the inventor and by the office, the novelty and the status of each individual relationship can be changed, and the instrument can be completely withdrawn because of a lack of level of inventiveness of its set operation. However, before this the inventor is permitted to propose modified relationships (up to the null set, that is to say without a scope of protection) in a limiting fashion to the office and third party within a period. The modified relationships are recorded in the data structure with the time of their granting. The inventor can appeal against these changes by the office.

In a fourth step (modification application): it is possible at any time, upon application of the inventor or of a decision at appeal, for example of a body of civil law conducting a substantive examination at appeal (patent court), for the instrument to be modified permissibly in a limiting fashion (up to the null set, that is to say without a scope of protection), to be withdrawn or to be revoked.

Consequently, in the case of examination of individual relationships an objection serves the purpose of a deeper clarification of the substantive accuracy and of the optional novelty (the novelty always signifies a novelty with respect to the individual relationship and not that of the development). Thus, the substantive accuracy of relationships and their allocation as a novel relationship are examined anew ex officio by means of more up-to-date knowledge on the basis of preliminary work by third parties. If parts of an objection (relationships) are granted formally and substantively, the office independently undertakes to integrate these relationships of third parties in the data structure as a document. Consequently, objections increase the number of officially examined relationships relating to further developments and lead in a self-consistent fashion to a higher degree of substantive accuracy, the preliminary work and the costs falling in each case to the objecting third parties, who are acting from the driving force to restrict or destroy an instrument.

In the case of the modification application, the individual parties likewise bear the outlay and the costs of the substantive preliminary work. Modification applications (for example cancellation applications) consequently likewise increase the number of officially examined relationships (since they come from a body conducting a substantive examination at appeal) and lead in a self-consistent fashion to a higher degree of substantive accuracy of the data structure.

As set forth above, the method for the management of developments essentially externally permits the maintenance of internationally customary and long-tried method steps for patents with an application for examination (application-examination-objection-modification application). Internally (on the official side), however, substantial modifications result. This requires, in particular,: changing the definition of "feature" into that of relationship, maintaining the exclusive meaning in terms of property rights of the generic concept, which has a clearly determining effect over the totality of the reference systems, as well as of the scope of protection, which has a clearly determining effect over the totality of the relationships.

Whereas previously each patent has been examined individually against the absolute world's knowledge, an examination is now made ex officio only of the substantive accuracy of N relative relationships (means-effect), of the novelty of novel relationships, and of the level of inventiveness of the set operation, in accordance with which the instrument is always evaluated either positively or negatively as a whole. The comprehensive substantive search previously necessary ex officio is eliminated, but is not a hindrance. The expensive "intrusion" of the official examiner in the understanding of a person skilled in the art who is reading the text of the patent document, as well as the subsequent abstraction of the effects (not specified) to produce the individual features of the main claim are eliminated. The examiner answers (per se, along the lines of the above example of solving the partial problem of corrosion protection) only questions of the type:

novelty of novel relationships:
Is there a novel relationship "yellow paint (means) sealing of the surface (effect)" in the totality of all reference system hierarchies→NO. In the case of YES, the individual relationship would not be novel, but this is not sufficient for not granting the instrument. The answering of this question can be supported via full text searches which search backwards over all relationships with equivalent significance within the dedicated data structure within the respective reference system hierarchy of the relevant relationship.

substantive accuracy of the (real) relationships: "Does yellow paint (means) clearly effect sealing of the surface (effect)"→YES, although the same effect in the ideal system is likewise correct with other means: "Does a closed separating layer (means) effect a one-to-one sealing of the surface (effect)"→YES. In the above case, by means of his relationships the inventor excludes (consciously or unconsciously) higher-order means. However, this is not significant for the office. "Does a surface shining yellow (means) clearly effect sealing of the surface (effect)"→NO (it is also possible to irradiate bodies with yellow), must, by contrast, lead to a 0% status of the relationship, but this is not sufficient for not granting the instrument. Answering this question can be supported by expert systems which search over all relationships with equivalent significance and 1% status within the dedicated data structure.

necessary level of inventiveness (for example, max. N=3 and min. M=1 novel relationship with 1% status): "1%: 1; 2; novel+1%: 1"→INVENTIVE, but "1%: 1; 2; 3; 4; novel+1%: 1; 2)"→NOT INVENTIVE, the latter is sufficient for not granting the instrument. Answering this question can be automated via suitable procedures by arranging that the latter read out the status data of the relationships and neutrally examine the decision criteria.

The office justifies these decisions to the inventor. Although not necessary, it is nevertheless advantageous also to inform the inventor of negative grounds for decision (and obvious proposals).

Such a method for computer-aided management of developments could start at any time on the basis of an initial relationship system which has a substantive classification. For example, a modified IPC which corresponds in a rudimentary fashion to the necessary structure of relationship systems is suitable. All more recent developments are automatically classed as instruments and documents in such a relationship system by the formal requirements of applications, objection etc., the substantive accuracy of the relationships being successively matched to one another by virtue of the fact that the office provides false ones with the status of 0%. Standardized official weightings of individual examiners, offices, countries etc. can be determined by the corresponding evaluation using rational status data. In addition, integration into a KI system based on fussy logic makes it possible for such a weighting of the status of the relationships to be rendered dynamic with the number of the subsequent relationships realized via them, the opinion of the majority thereby being taken into account.

The result per development is a structure between the ordered relationships with a maximum of N references. Consequently, the developments form a partially hierarchical and partially neural structure of relationships. Each structure point is a development (for example a special individual IPC) whose scope of protection results clearly from the totality of its relationships. Each further development can conversely be interpreted through novel relationships of known developments. This structure is substantively determined and can be successively matched. It therefore offers secondarily a source for a substantive expert system. The hierarchy integrates the substantive dependence and the classified nature integrates the development history, as a result of which all documents or their instruments which can be achieved through backward relationships are always used, and thus are infringed relative to the optional official rights, and this can therefore be determined clearly by computer-aided searching.

In addition to the database structure described it is appropriate for each structural point or development in another dimension to be provided with status data relating to application date, inventor, legal status such as are contained, for example, in conventional tabular databases for developments. The aim at this juncture is to dispense with considering special cases for instruments such as instances of taking priority, administrative extensions, divisions etc., all of which can be realized. It is conceivable that, via unique indicators, for example via (patent) numbers, the individual structural points of developments are linked to existing databases which contain the full text, for example, as a result of which the invention forms a higher-order data structure which simultaneously serves as a classification system for developments, as a substantive expert system and for the purpose of the official management of instruments.

BRIEF DESCRIPTION OF THE DRAWINGS

Exemplary embodiments of the invention are employed below to explain in more detail, with the aid of FIG. 1, the systems uniquely determined by set operations of relationships, and, with the aid of FIG. 2, the data structure for the development management.

DESCRIPTION OF PREFERRED EMBODIMENTS

Figure 1:
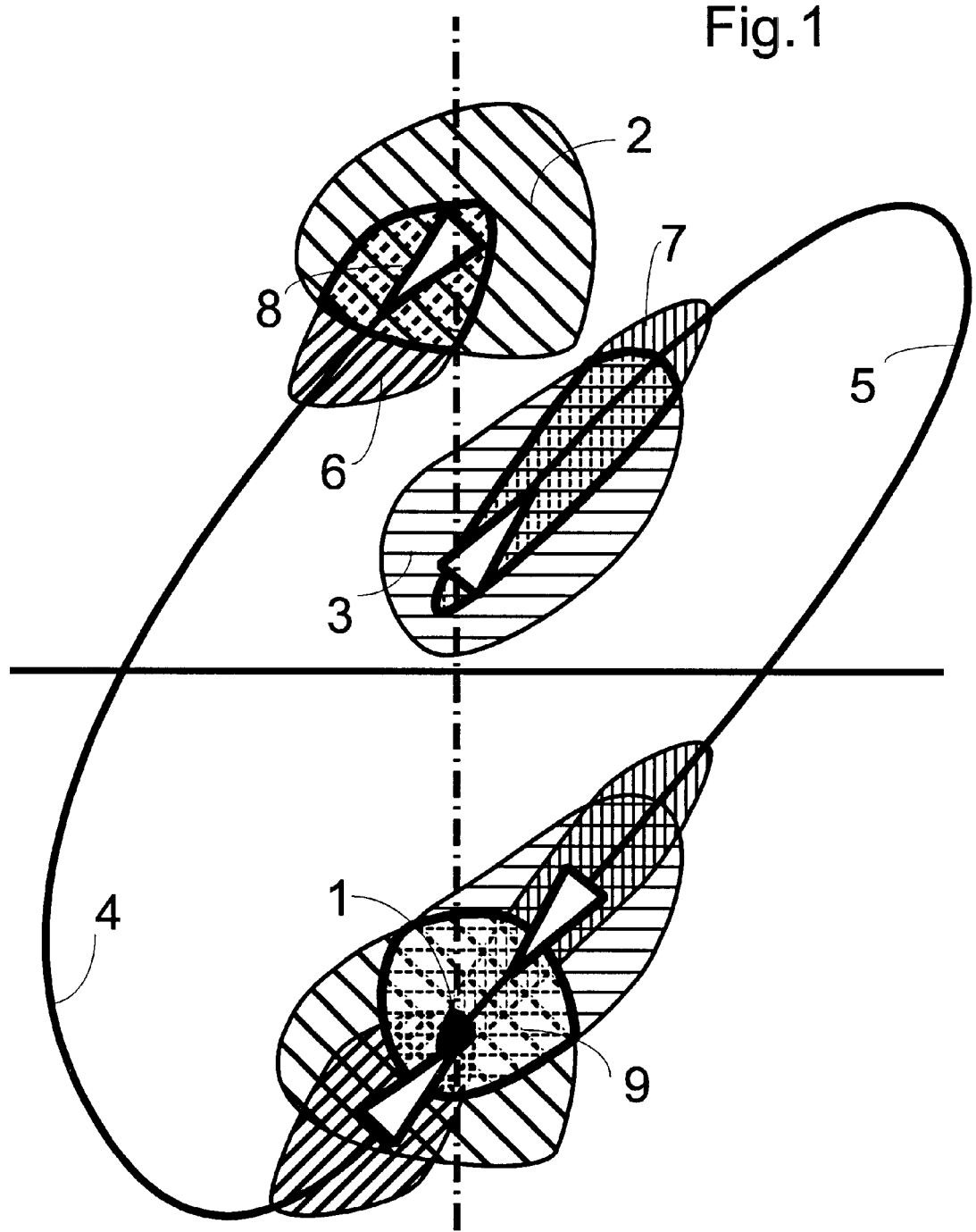

According to FIG. 1, a development system $\{ES\}$ 1 is formed by linking a reference system I $\{BS\ I\}$ 2 and a reference system II $\{BS\ II\}$ 3 via in each case one relationship I $\{B\ 1\}$ 4 and one relationship II $\{B\ II\}$ 5. Each relationship [4, 5], originating in each case from a defined reference system [2, 3], in each case describes a (problem—solution) system $\{S\}$ [6, 7] by the formulation of the relationship [4, 5]. The relationship 4 preferably determines the reference system 2 via the unique classification of the latter, and the (problem-solution) system 6 by the verbal or usual problem formulation {means-effect} of the latter. Set operations (OR, AND, NOT) can be used internally by means of appropriate formulations. Since it is in practice always (real) relationships which are involved, the sets $\{BS\}$ and $\{S\}$ are not of the same content, with the result that the relationship 4 refers only to partial solutions 8 conformal with the reference system through the formation of the intersection set $\{BAS\}=\{BS\}\cap\{S\}$. The degree of congruence is the responsibility of the inventor, who proposes that the office should record in the data structure a development having the relationships 4 proposed by him. The linking via the relationships [4, 5] of the reference systems [2, 3] previously considered separately uniquely defines the development system 1 as intersection set via $\{ES\}=\{BS\ I\}\cap\{BS\ II\}\cap\{S\ I\}\cap\{S\ II\}$. The generic concept $\{G\}$ 9 of the development is likewise uniquely determined via $\{G\}=\{BS\ I\}\cap\{BS\ II\}$.

Thanks to these (mathematically) unique definitions, the latter are rigorously logical, and thus programmable, and can be carried out or monitored in a computer-aided fashion. By means of permissible, time-limited modifications of the formulations of the (problem-solution) system of the relationships (from the pool of the description), it is possible for the set of the partial solutions conformal with the reference system to be changed subsequently per relationship, but necessarily not beyond the set defined by the generic concept $\{G\}$, since said set is defined exclusively via the reference systems $\{BS\}$. For this reason, the generic concept $\{G\}$ and the development system $\{ES\}$ permit the unique determination of official rights contained in instruments, on the one hand, and the determination of their infringement, on the other hand. This is possible via searches because of the computer-aided data structure.

Because of these (mathematically) unique relationships, it is necessarily already in the interests of the inventor, who is claiming an instrument for his invention, to formulate the substantive relationship correctly and with maximum clarity. In the ideal case, the sets $\{BS\}$ and $\{S\}$ have the same contents and then are subject to specific properties (Hilbert spaces) and exhibit no redundancy. A profound substantive consideration of the development before registration in the data structure supports a high degree of congruence in this sense and low redundancy and, in particular, partial solutions which are more conformal with the reference system. It is conceivable that the relationships evaluated as substantively accurate converge to ideal relationships via weightings of the substantive accuracy of each relationship in conjunction with a dynamic reappraisal thereof over the entire data structure. Consequently, an expert system is constructed from the data structure which successively collects and classifies the world's knowledge brought together by registrations, and substantively arranges said knowledge dynamically by weightings, as a result of which an expert system with a continuously sinking redundancy is finally produced.

It is likewise conceivable that the development field is an industry whose individual branches emerge from one another (become disentangled and interlocked) in economic terms over time for solving specific problems. As a result, there are likewise substantive relationships between them. If this interpretation is transferred to the system presented for computer-aided development management, it should likewise be possible by means of the driving force of the economic success of the inventors (here, better proprietors), for example via the targeted official access to markets (for example stock exchanges) for this substantive relationship necessarily to be brought by the proprietor into the data structure; which, in turn, develops with time to an expert system of low redundancy which represents the foundation of correct strategic economic decisions.

It is, moreover, conceivable that the development field is a natural evolution, for example for the biology of all living creatures whose species emerge from one another biologically (are transformed and interbreed) over time for solving specific problems, for example for optimum biological adaptation. As a result, there are likewise substantive relationships between them. If this interpretation is transferred to the system presented for computer-aided development management, for example in the case of the management and classification of parts of hereditary information (genes), it should likewise be possible by means of the driving force of the biological success of the inventors (here, the variety of nature), for example overall via the targeted access to food and sexual partners, or also only via a higher weighting of the use of a separable partial problem during life, for this substantive relationship necessarily to be brought by the proprietor (variety of nature) into the data structure (relationship of all genes) which, in turn, develops with time to an expert system of low redundancy (genealogical table of the species) which represents the foundation of correct decisions in evolutionary history.

Leaving aside this knowledge relating to the course of evolution, the technical use becomes clear when another point of view is selected. In this case, the inventor (variety of nature) acts not in a personalized, but in a random fashion. The system for (in the transferred sense) computer-aided development management is active, and each living creature is an image of incremental disturbances in this data structure, this image being accessible through documents (sequences of the DNA) in the cells of the living creatures. In accordance with the basic data structure, the developments (genes) form a partially hierarchical (mutation) and partially neural (free combinability) structure of relationships (in the form of structural information for storing on the linear memory of the DNA) which can be differently weighted (conceivably via variable information storage of this weighting at a further point in the living creature). The (biologically) protected instruments with frozen relationships and their dependent instruments are restricted in their development (via isolation reaching as far as inbreeding) with respect to the remaining developments with free relationships (cross-breeding).

Since success was achieved in reading the gene sequences of living creatures on a relatively large scale, complete hereditary information is available as molecular program code (of the DNA). This hereditary information must be strongly redundant in order to permit a large number of novel species. However, it is very expensive to evaluate strongly redundant information. There is the problem however, of obtaining this structural information. Assuming that the data structure (natural selection) realized in successful species consists of a low-redundance (characterization of the species) and a high-redundance (for further development) subset, in the case of species of the same genus the low-redundance subset should be identical except for the species-specific subsets. In the case of a multiplicity of items of hereditary information which have been compared with one another, it is likewise possible to determine the data structure of the evolution from the respectively identical regions by an appropriate higher weighting of the relationship belonging to this region (this time by a defective measurement of the molecular program code). However, it is necessary always to examine the (partly complete) total hereditary information of a species since the standardization condition of the weighting is otherwise not fulfilled. The technically useful (biologically simplest) genes should be found near the root of the data structure. They certainly possess a substantial technical and economic importance.

It is to be noted that in the mathematical sense the relationships (means-effect) or the developments can be regarded as elements of a Hilbert space, a unique allocation to the (here) operator (problem-solution) being fulfilled, according to the RIESZ theorem. The inversion of the relationship is described by another, the dual, operator. In the limiting case of an ideal data structure with minimum redundancy, both are identical. The operator is symmetrical in this case, and it is to be expected that the preconditions of being self-adjoint are fulfilled. Reference may be made concerning the method for reducing redundancy of the data structure to the MAXWELL demon (thermodynamic), disturbances (fluctuations) and an evaluation of individual such disturbances (by the demon) leading to a reduction in entropy. In the above discussion, the role of the demon is assumed as appropriate by the patent office, the economic supervisory body and nature. Since this is in each case an (external) control, there is no infringement of basic laws (2nd main proposition).

Figure 2:
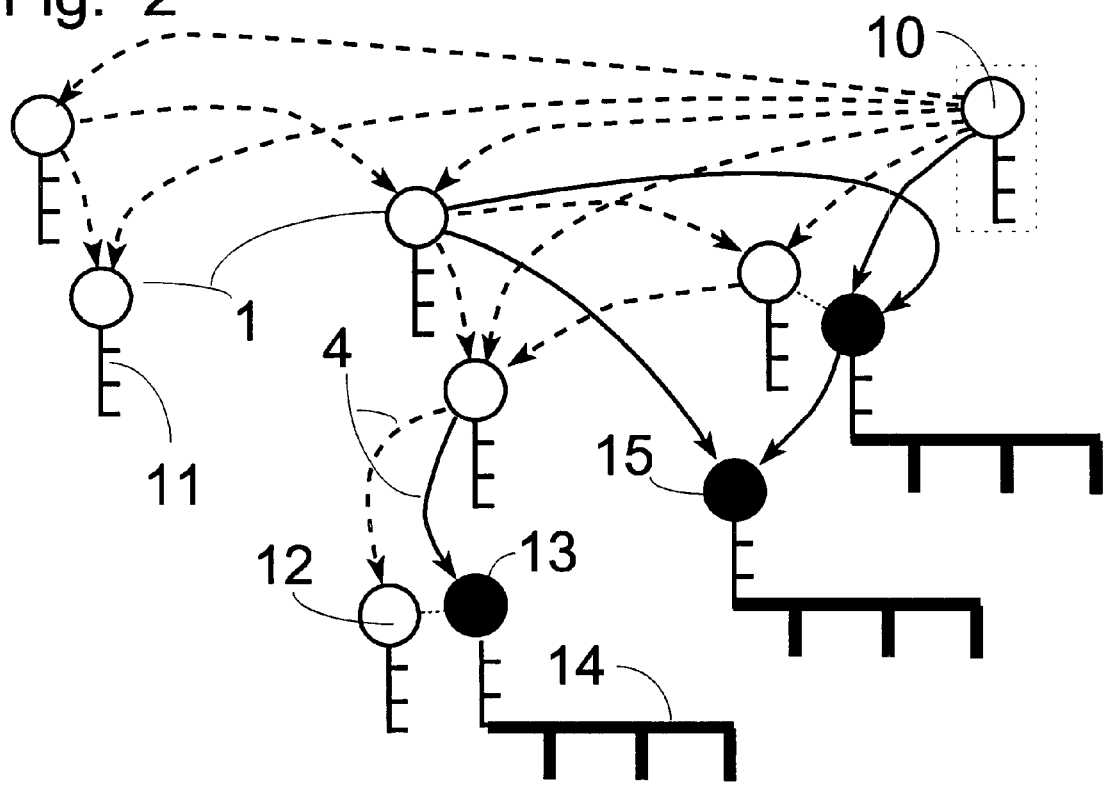

According to FIG. 2, the data structure for development management denotes a multiplicity of development systems 1 which emerge from one another by means of set operations in a fashion proceeding hierarchically from a root system 10 via orientated relationships 4, which systems completely contain the development region to be covered (for example, nuclear power engineering, mechanical engineering, technically applicable, artistic configuration). Each development system 1 is linked to a small database 11 (preferably a tabular one), which contains, in particular, the definition of the development system 1 serving as reference system 2, the formulation and status (substantive accuracy, novelty, time, inventor, publicity, etc.) of each individual relationship 4 forming the allocated development system 1, as well as unique indicators of further data. The development systems 1 are subdivided into documents 12 and instruments 13, the instruments 13 emerging at a specific point in time as a copy from individual documents 12 and exhibiting special properties, for example a temporarily constant status, the link with official rights, a unique reference to content databases 14 etc. Thus, instruments 13 which relate via relationships 4 to other development systems 1 constitute dependent instruments 15 of the same status in time as the instruments 13. Evaluations relating to individual relationships can be determined, managed and modified dynamically over time via the status, which can be multifariously structured (official, country-specific or group-specific ramification) and weighted in a standardized way in a scalar fashion or in further developments. This can be performed by people in offices, by involvement of third parties and by the use of systems of artificial intelligence.

LIST OF REFERENCE SYMBOLS

1 Development system
2 Reference system
3 Reference system II
4 Relationship
5 Relationship II
6 System
7 System II
8 Partial solution conformal with reference system
9 Generic concept
10 Root system 11 Database
12 Document
13 Instrument
14 Content database
15 Dependent instrument

What is claimed is:

1. A method of computer-aided management of a database having a neural data structure in order to update the database for developments by a multiplicity of development inventors and to evaluate individual developments in view of the entire database, the method comprising the steps of:

a) storing the database in a database storage and management system, said database storage system comprising at least one computer storage means and at least one document filing system of an artificial intelligence system;

b) registering developments by finding relationships between each of the developments and one or several reference systems which appear most obvious and storing the relationships in a relational databank associated with the respective developments;

c) determining the accuracy of each of said relationships and changing a status of each of said relationships, as needed, according to said accuracy;

d) successively adapting the data structure of the database to the respective developments;

e) making the relationships of the data structure dynamic by integration of the database into the artificial intelligence system, said artificial intelligence system being optionally based on physiologic;

f) performing operations available in the artificial intelligence system on elements in the database including the developments; and g) monitoring the developments in the database in order to determine a level or degree of inventiveness of different developments;

whereby the database becomes an expert system characterized by a continuously lower data redundancy.

2. The method according claim 1, wherein the database comprises a patent system database and the developments include issued patents, utility models and technical publications as well as property rights data, and further comprising performing a computer-aided examination, official management, monitoring, maintenance, search and processing of world knowledge within a classification system in order to determine said relationships between said developments and building linked tabular databanks according to said relationships.

3. The method according to claim 2, further comprising including inventor data regarding the development inventors and correlations between said inventor data in the database, identified portions of problems solved by the respective different inventors and including said portions in the database, providing correlated systems of data regarding said developments, said inventor data and said relationships for determining a scope of protection to be accorded said developments based on said world knowledge in said database and incrementally expanding or modifying the database by means of information provided by third parties and official examinations, whereby expansion of the current state of the world knowledge for substantive examination results as well as a reduction of redundancy.

4. The method according to claim 1, wherein said database is an economic database for an industry having individual branches and further comprising performing economic decisions for said industry according to said developments that occur in and of the individual branches that interact or interfere with each other, said developments including solutions to specific problems in said individual branches.

5. The method according to claim 1, wherein said database is a DNA database including DNA sequence data and further comprising evaluation of said DNA database to identify useful genes or to discover functions based on said DNA sequence data.

6. The method according to claim 1, further comprising the steps of linking respective ones of said reference systems (BS I, 2; BS II, 3) via corresponding ones of said relationships (B I 3, BII 4) to define problem-solution systems (S I 6, S II 7) and forming a development system (ES, 1) as an intersection of connected pairs of said reference systems (BS I, 2; BS II, 3) and said problem-solution systems (S I, S II).

7. A computer-aided database management system for a database having a neural data structure in order to update the database for developments by a multiplicity of development inventors and to evaluate individual developments in view of the entire database, said system comprising:

means for storing the database in a database storage and management system, said database storage system comprising at least one computer storage means and at least one document filing system of an artificial intelligence system;

means for registering developments by establishing relationships between each of the developments and one or several reference systems which appear most obvious and for storing the relationships in a relational databank associated with the respective developments;

means for determining the accuracy of each of said relationships and for changing a status of each of said relationships, as needed, according to said accuracy;

means for successively adapting the data structure of the database to the respective developments;

means for making the relationships of the data structure dynamic by integration of the database into the artificial intelligence system, said artificial intelligence system being optionally based on physiologic;

means for performing operations available in the artificial intelligence system on elements in the database including the developments; and means for monitoring the developments in the database in order to determine a level or degree of inventiveness of different developments;

whereby the database becomes an expert system characterized by a continuously lower data redundancy.

* * * * *